Nov. 29, 1932.  A. C. OUTLAW  1,889,693
FLUID EQUALIZER FOR BOILERS
Filed Oct. 20, 1928  2 Sheets-Sheet 1

Alonzo C. Outlaw, INVENTOR
BY Victor J. Evans
ATTORNEY

WITNESS:

Nov. 29, 1932.    A. C. OUTLAW    1,889,693
FLUID EQUALIZER FOR BOILERS
Filed Oct. 20, 1928    2 Sheets-Sheet 2

Alonzo C. Outlaw,
INVENTOR

Patented Nov. 29, 1932

1,889,693

UNITED STATES PATENT OFFICE

ALONZO C. OUTLAW, OF TONKAWA, OKLAHOMA

FLUID EQUALIZER FOR BOILERS

Application filed October 20, 1928. Serial No. 313,852.

This invention relates to fluid equalizing means for a plurality of boilers, tanks or other liquid containers, the general object of the invention being to provide means for connecting the containers together so that liquid will flow to all of the containers, or from one container to another so that the liquid level will be the same in all of the containers.

This invention also consists in certain other features of construction and in the combination and arrangement of the several parts, to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:—

Figure 1:
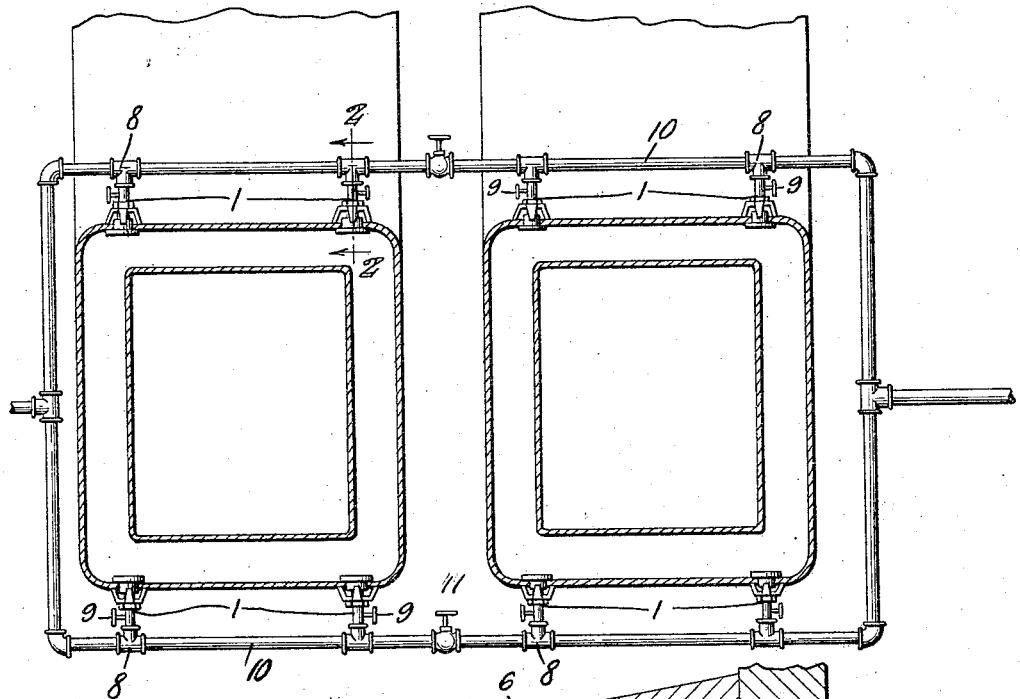
Figure 1 is a bottom plan view, with parts in section, showing the invention applied to a pair of boilers.

In these views, the numeral 1 indicates a tube which is threaded at both ends and which is provided with an annular enlargement 2 intermediate its ends, a portion of the enlargement being threaded. One of the threaded ends of this tube is adapted to be threaded in a hole formed in a plug 4 which is placed in a hole formed in the manhole cover plate of a boiler or in a hole formed in any other suitable place of a boiler or other liquid container.

The plug is provided with a head and this head fits against a gasket 5 placed on the inner wall of the liquid container so that the plug will make a liquid-tight joint and prevent leakage of liquid between itself and the walls of the hole in which it is placed.

A spacer, such as a crowfoot 6, is placed on the exterior part of the liquid container and surrounds the projecting end of the plug, with the unthreaded part of the enlargement 2 passing through the hole in said spacer, and then a nut 7 is placed on the threaded part of the enlargement and presses against the spacer so as to hold the parts firmly in position with the plug pressing firmly against the gasket. The outer end of the tube 1 is threaded into a coupling 8 which is suitably connected to a liquid supply pipe. The outer end of the tube 1 carries an inwardly opening valve 9 which acts as a check valve to permit liquid to enter the container through the tube 1, but prevents the liquid flowing in an opposite direction.

Figure 2:
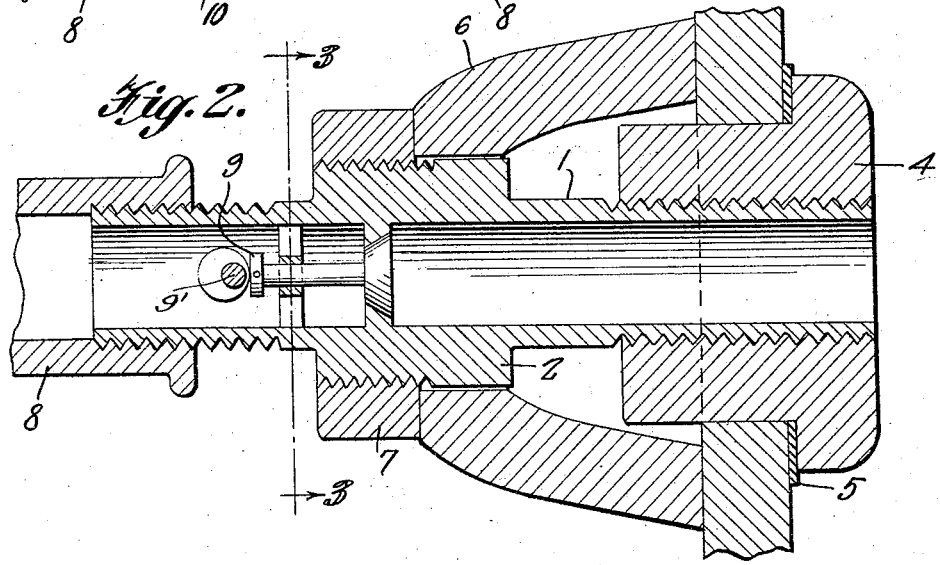
Figure 2 is a section on line 2—2 of Figure 1.
Figure 3:
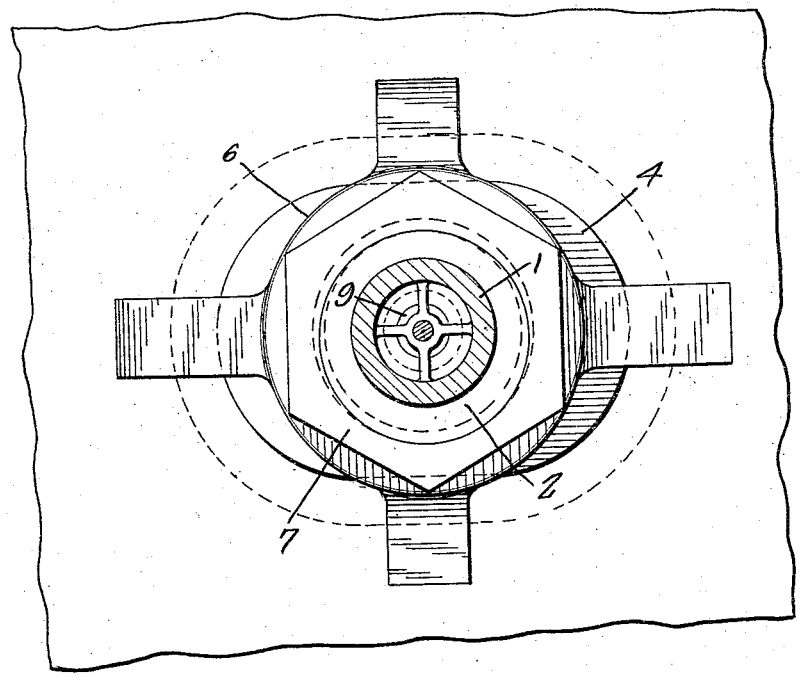
Figure 3 is a section on line 3—3 of Figure 2.
Figure 4:
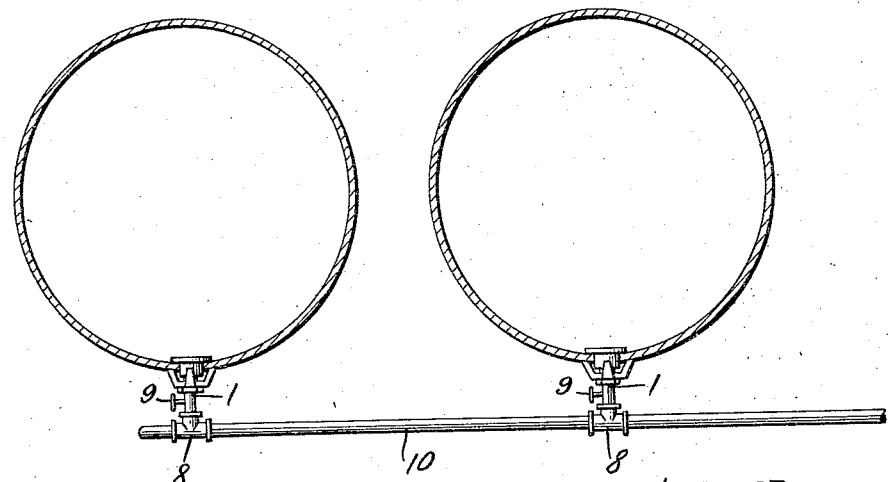
Figure 4 is a sectional view showing the invention applied to a pair of tanks.

As shown in Figures 1 and 2, a plurality of these tubes 1, with their associated parts, are placed in the containers and pipes 10 connect the couplings 8 together or with a supply pipe so that when the supply is turned on, the liquid will flow to the various containers and thus fill all the containers to the same level.

Of course, the invention can be used to connect two or more containers together and the liquid supplied to one of the containers so that the liquid will pass from this container to the others, but in this case, the check valves 9 would have to be opened. This is done through means of an eccentric on a stem 9'. This arrangement can also be used for blowing out the boilers. Stop cocks 11 are also provided in the system to permit this blow-off operation.

It is thought from the foregoing description that the advantages and novel features of the invention will be readily apparent.

It is to be understood that changes may be made in the construction and in the combination and arrangement of the several parts, provided that such changes fall within the scope of the appended claim.

What I claim is:—

A device of the class described comprising a plug adapted to be inserted in a container and having a central threaded hole therein, a tube having oppositely threaded ends with one end thereof threaded in said hole, said tube having an annular exterior enlargement intermediate its threaded ends with the major portion of the enlargement threaded and the remaining portion of the enlargement unthreaded, a skeleton spacer comprising a member having a central part and legs extending from the central part, the legs bearing against the container in embracing relation with respect to the plug and the central part having an opening therein and receiving the unthreaded part of the enlargement, a nut on the threaded part of the enlargement and bearing against the spacer to slide the latter on the unthreaded portion of the enlargement and force the legs of the spacer against the container.

In testimony whereof I affix my signature.

ALONZO C. OUTLAW.